United States Patent [19]

Zwick

[11] Patent Number: 4,515,394
[45] Date of Patent: May 7, 1985

[54] WHEEL LOCK AND STAND ASSEMBLY FOR TRAILER

[75] Inventor: David J. Zwick, Stoystown, Pa.

[73] Assignee: The Coleman Company, Inc., Wichita, Kans.

[21] Appl. No.: 428,384

[22] Filed: Sep. 29, 1982

[51] Int. Cl.³ .............................................. B60S 9/02
[52] U.S. Cl. ................................. 280/764.1; 16/35 R
[58] Field of Search .................... 280/475, 656, 763.1, 280/764.1, 765.1, 766.1, 78, 47.32, 47.31, 653; 16/35 R

[56] References Cited

U.S. PATENT DOCUMENTS 1,794,630  3/1931  Linn ................................. 280/763.1
2,113,448  4/1938  Hewitt ............................. 280/764.1

Primary Examiner—Joseph F. Peters, Jr.
Assistant Examiner—Joseph McCarthy

[57] ABSTRACT

A wheel lock and stand assembly for a trailer in which a swivel wheel lock locks the wheel against swiveling when the stand supports the trailer and unlocks the wheel when the stand is raised. A locking arm which is engageable with the swivel mechanism is mounted on a rotatable shaft, and a crank arm on the shaft is connected to the stand by a link. As the stand is lowered and raised, the link and the crank rotate the shaft to bring the locking arm into and out of engagement with the swivel mechanism.

6 Claims, 14 Drawing Figures

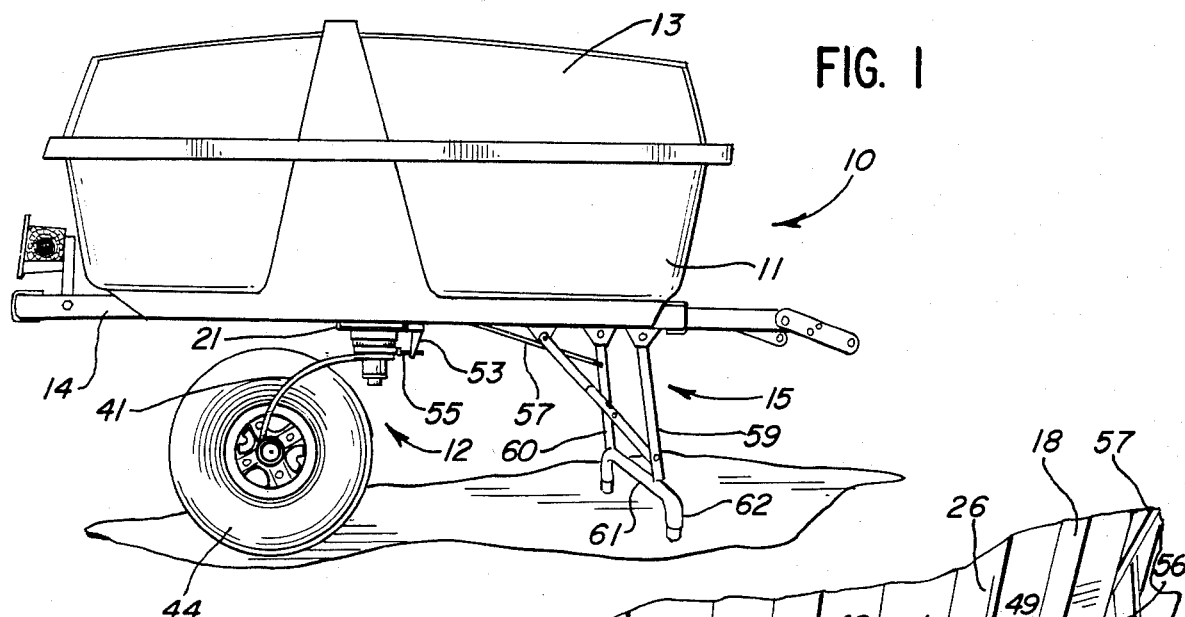
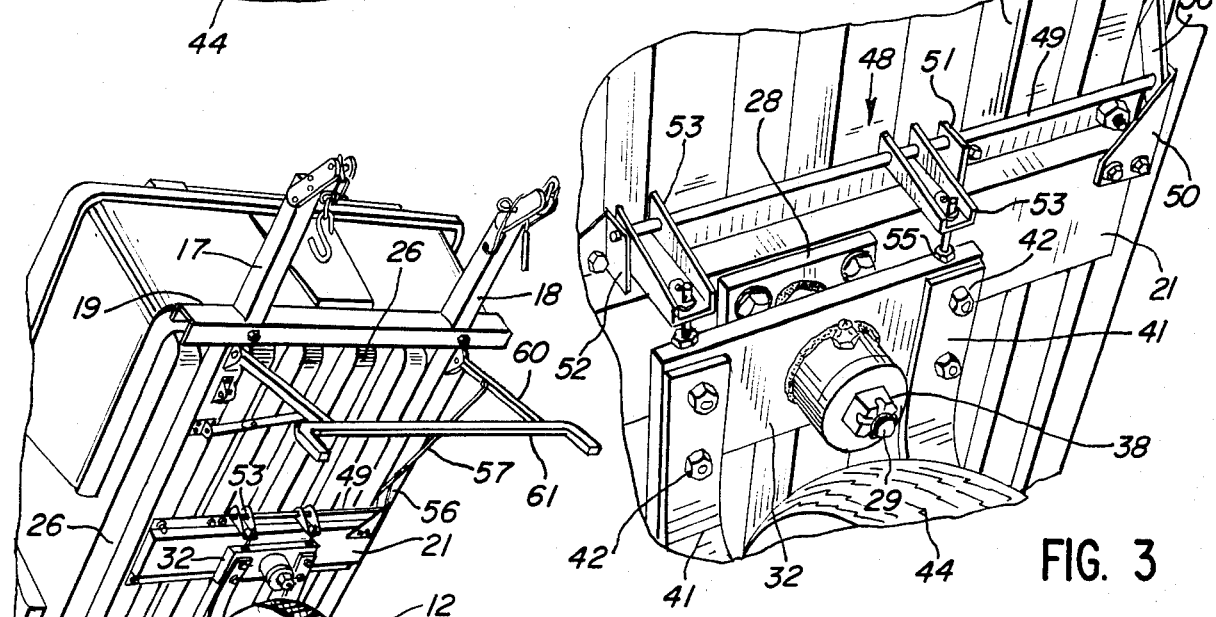
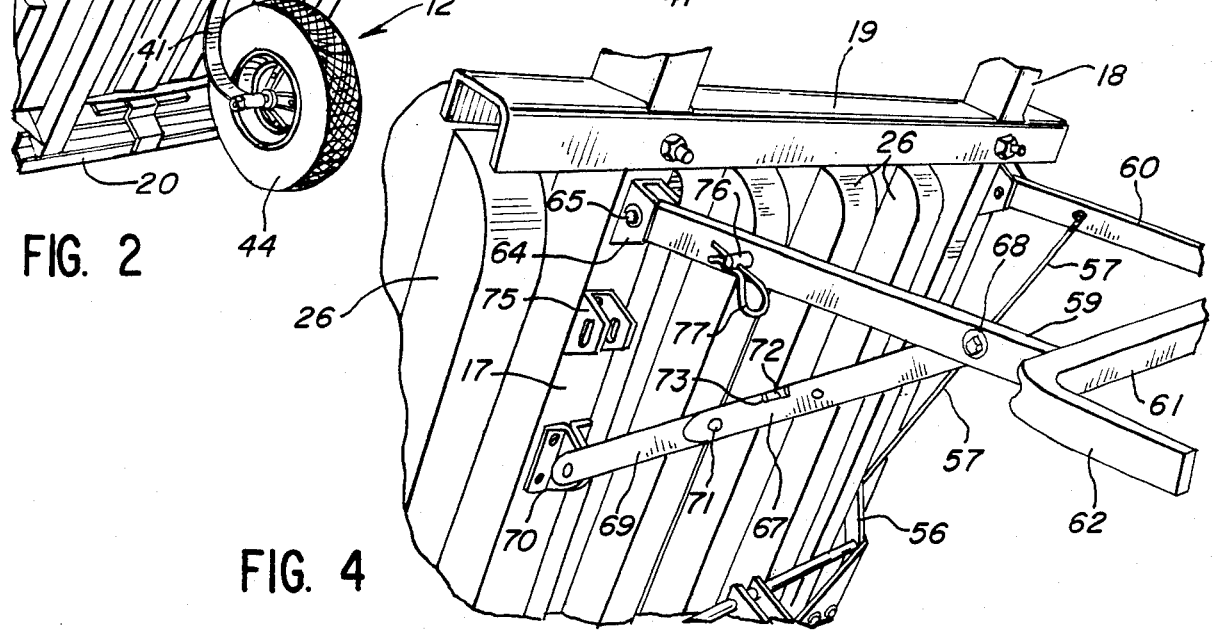

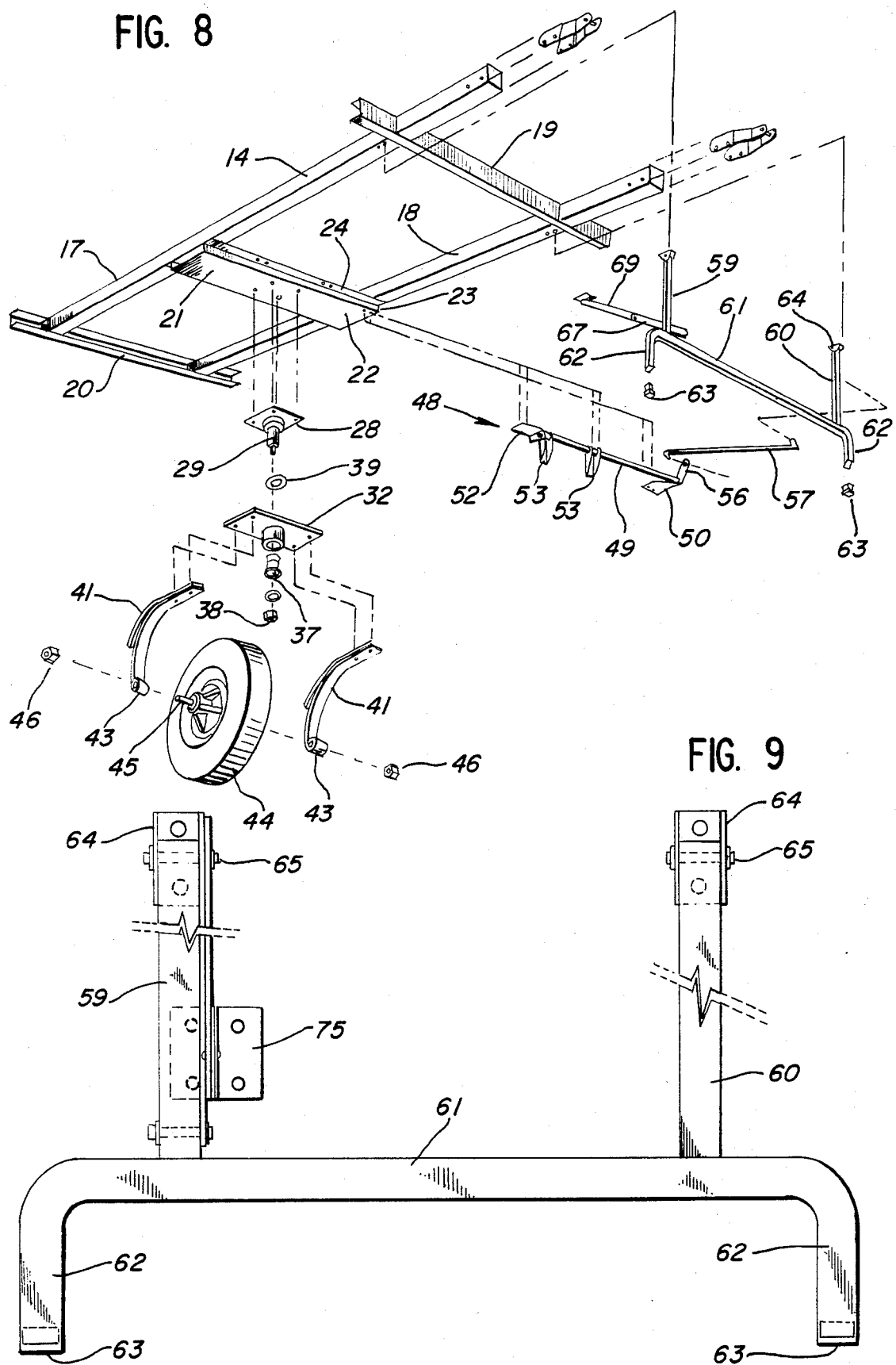

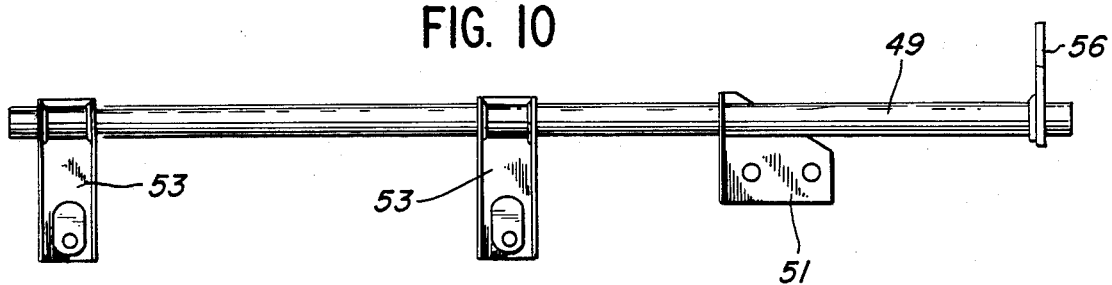
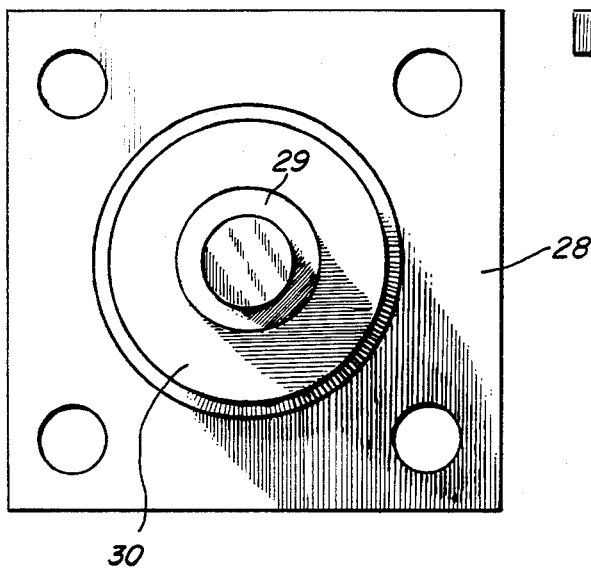
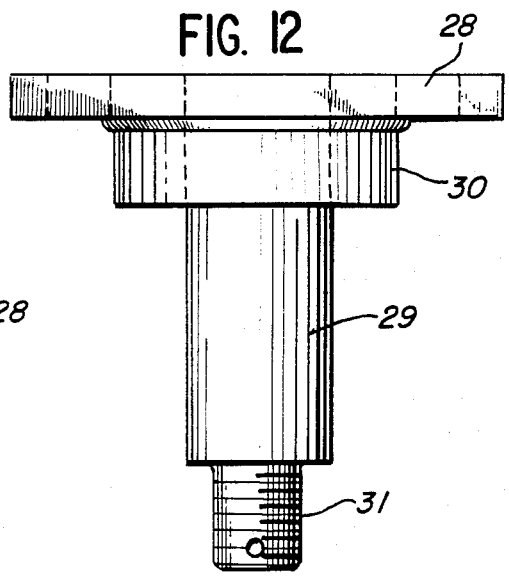
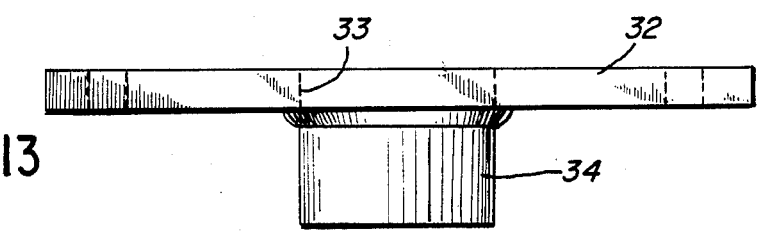
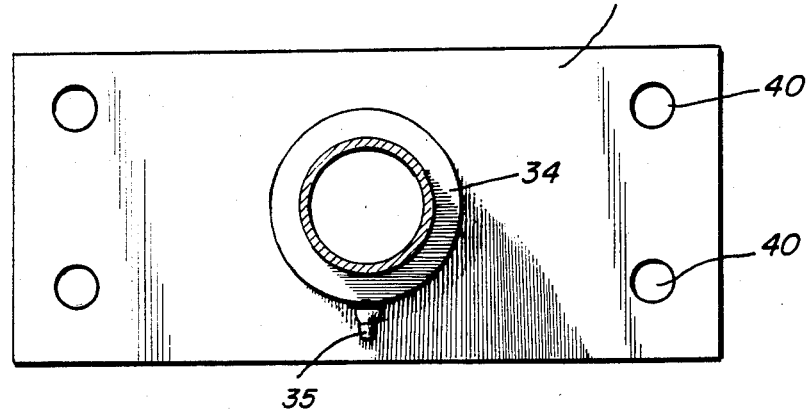

WHEEL LOCK AND STAND ASSEMBLY FOR TRAILER

BACKGROUND AND SUMMARY

This invention relates to a wheel lock and stand assembly for a trailer.

It is often desirable to provide a trailer with a caster wheel, i.e., a wheel which swivels as the trailer changes direction as it is being towed or backed up by a towing vehicle. However, some means for locking the wheel against swiveling should be provided so that the trailer can be manipulated during hitching and unhitching and when the trailer is being moved separately from the towing vehicle. A stand assembly is also desirable for supporting the trailer when it is unhitched.

U.S. Pat. No. 2,113,448 describes a single wheel trailer which includes means for lowering support legs and for pivoting a yoke into locking engagement with the wheel assembly. This arrangement includes an operating lever which must be manipulated by the user, and the yoke cannot be pivoted into its locking position unless the wheel is in a straight position.

The invention provides a simple yet reliable stand and wheel locking device. The stand and the wheel locking device are directly connected by a rigid link, and movement of the stand will move the locking device. The locking device includes a shaft which is rotatably mounted adjacent the swivel mechanism, and locking arms on the shaft can be rotated into engagement with the swivel mechanism. The locking device can be moved to its locking position even if the wheel is not straight, and the wheel will be forced into a straight position by the locking device.

DESCRIPTION OF THE DRAWING

The invention will be explained in conjunction with an illustrative embodiment shown in the accompanying drawing, in which FIG. 1 is a perspective view of a single wheel trailer equipped with a wheel lock and stand assembly in accordance with the invention;

FIG. 2 is a fragmentary perspective view of the bottom of the trailer;

FIG. 3 is an enlarged fragmentary perspective view of the wheel lock assembly;

FIG. 4 is an enlarged fragmentary perspective view of the stand assembly;

FIG. 8 is an exploded perspective view of the stand assembly, lock assembly, and wheel assembly;

FIG. 9 is a plan view, partially broken away, of the stand assembly;

FIG. 10 is a plan view of the lock assembly;

FIG. 11 is a plan view of the swivel shaft for the wheel;

FIG. 12 is an elevational view of the swivel shaft for the wheel;

FIG. 13 is an elevational view of the wheel mounting plate; and

FIG. 14 is a plan view of the wheel mounting plate.

DESCRIPTION OF SPECIFIC EMBODIMENT

Figure 5:
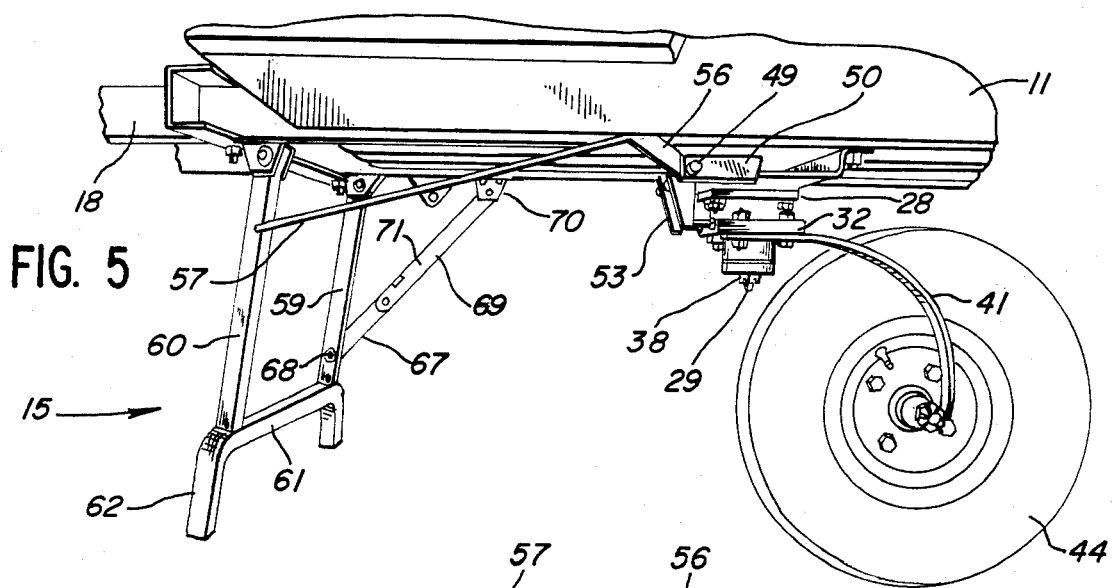
FIG. 5 is a fragmentary perspective view showing the stand assembly in its lowered or supporting position and the lock assembly in its locking position.

Referring to FIGS. 1–4, a trailer 10 includes a container body 11 which is supported by a wheel assembly 12. The body 11 has an open top which is closed by a removable cover 13.

The body may be advantageously molded from plastic and is supported by a metal frame or chassis 14 (see also FIG. 8). The wheel assembly 12 is attached to the frame. In FIG. 1 the front end of the trailer is supported by a stand assembly 15 which is also attached to the frame.

The frame 14 is shown in FIG. 8 and includes a pair of side tubular members 17 and 18 and a pair of front and rear cross channels 19 and 20. The forward ends of the tubes 17 and 18 extend beyond the front channel 19 to provide a pair of attaching tongues for attaching the trailer to a towing vehicle. A wheel-mounting panel 21 is attached to the tubes 17 and 18 between the two cross channels. The panel 21 is channel-shaped in cross section and includes a flat central portion 22, a pair of upwardly extending side walls 23, and a pair of attaching flanges 24 which are bolted to the tubes 17 and 18. The bottom of the molded trailer body 11 includes a plurality of downwardly extending ribs 26 (FIGS. 2–4) for straightening the body, and the tubes 17 and 18 of the frame are inserted between adjacent ribs and bolted to the body.

Referring to FIGS. 8 and 11–14, the wheel assembly 12 includes a mounting plate 28 which is bolted to the wheel-mounting panel 21. A cylindrical shaft 29 is welded to the plate 28, and an annular spacer 30 surrounds the shaft and is also welded to the plate 28. The lower end of the shaft terminates in a reduced diameter threaded end portion 31.

A swivel plate 32 is provided with a central opening 33, and a cylindrical tube 34 is welded to the plate 32 around the opening 33. A grease fitting 35 (FIG. 14) is mounted on the tube 35 to provide grease to the interior of the tube.

A cylindrical bushing 37 (FIG. 8) is inserted into the tube 34 for rotatably mounting the swivel plate 32 on the shaft 29, and the swivel plate is retained on the shaft by a washer and a nut 38 (FIG. 3) which screws onto the threaded end 31 of the shaft. An annular bushing 39 is inserted over the shaft between the upper surface of the swivel plate and the spacer 30 on the mounting plate.

The swivel plate 32 is provided with four bolt holes 40, and a pair of curved leaf springs 41 are bolted to the swivel plate by bolts 42 (FIG. 3). Each of the leaf springs terminates in a looped lower end 43, and a cylindrical nylon bushing is inserted into each looped end. A wheel 44 is mounted on an axle 45 having threaded ends, and the ends of the axle are inserted through the bushings in the leaf springs and retained by nuts 46.

The swivel plate 32 and the wheel 44 can be locked against swiveling movement about the shaft 29 by a lock assembly 48 (FIG. 3). The lock assembly includes a shaft 49 which is rotatably supported by three mounting brackets 50, 51, and 52 which are bolted to the wheel-mounting panel 21 (see also FIG. 8). The shaft extends through a pair of channel-shaped locking arms 53, and the locking arms are welded to the shaft so that they rotate with the shaft. A bolt 55 is threadedly engaged with each locking arm, and when the locking arms are in their locking position illustrated in FIGS. 1-3, the heads of the bolts 55 engage the front edge of the swivel plate 32 and prevent the swivel plate from rotating on the shaft 29.

The shaft 49 is rotatable by a crank arm 56 which is welded to the shaft 49 adjacent one side of the trailer. The crank arm is rotated by a rigid connecting rod 57. One end of the connecting rod is pivotally connected to the crank arm, and the other end of the rod is pivotally connected to the stand assembly as will be explained more fully hereinafter.

The stand assembly 15 includes a pair of legs 59 and 60 and a U-shaped cross brace 61 which is attached to the lower ends of the legs. The cross brace terminates in a pair of leg portions 62. End caps 63 (FIG. 8) are inserted into the ends of the tubular leg portions. The upper end of each of the legs 59 and 60 is pivotally connected to a U-bracket 64 by a pin 65 (FIGS. 4 and 9). Each U-bracket is bolted to one of the frame tubes 17 and 18.

A lower lock brace 67 (FIGS. 4 and 5) is pivotally attached to the leg 59 by a pin 68, and an upper lock brace 69 is pivotally attached to a bracket 70 on the frame tube 17. The two lock braces overlap and are pivotally connected by a pin 71. The upper lock bracket includes a laterally extending tab 72 (FIG. 4) which is received in a slot 73 in the lower lock brace to lock the braces in a slightly overcenter position as shown in FIGS. 4 and 5. Such lock braces are conventional and further details are unnecessary.

Figure 6:
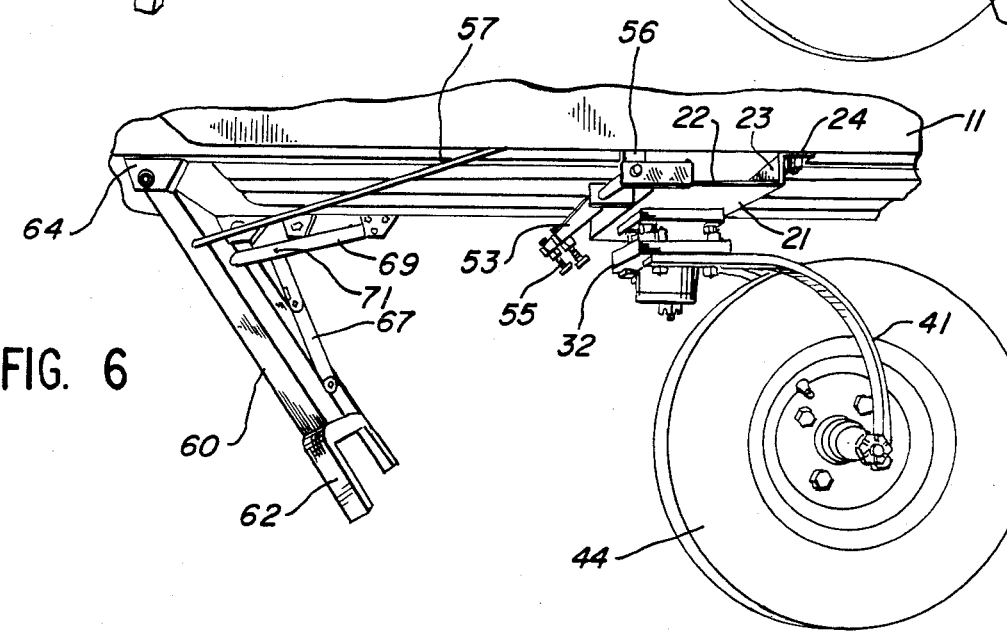
FIG. 6 is a view similar to FIG. 5 showing the stand assembly and the lock assembly moving toward their alternate positions.
Figure 7:
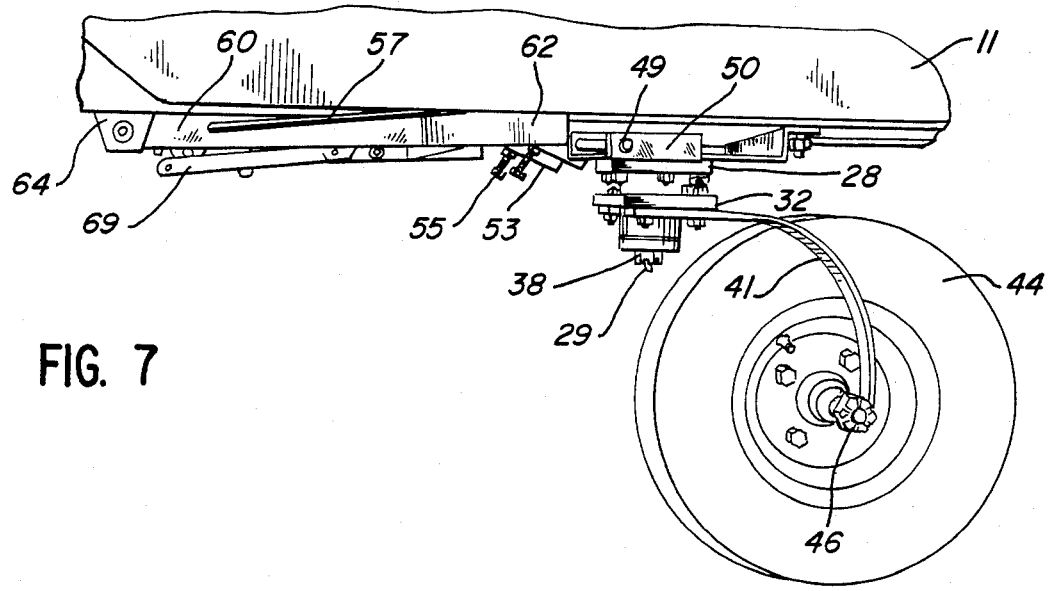
FIG. 7 is a fragmentary perspective view showing the stand assembly in its raised or storage position and the lock assembly in its unlocked position.

When the lock braces are locked as in FIGS. 4 and 5, the stand assembly 15 is maintained in an upright position and supports the front of the trailer. The legs 59 and 60 extend slightly forwardly and downwardly from their pivot connections to the trailer. The stand can be pivoted upwardly to a storage position by supporting the front of the trailer and moving the lock braces overcenter so that they pivot about the connecting pin 71 as shown in FIG. 6. The stand assembly is shown in its storage position in FIG. 7. The legs 59 and 60 extend just below the frame tubes 17 and 18. The leg 59 is received in a U-bracket 75 (FIG. 4) on the frame tube 17, and the stand assembly can be locked in the storage position by a pin 76 which is inserted through the leg 59 and through holes in the sides of the bracket 75. The pin is retained by a cotter pin 77. When the stand assembly is in its support position, the pin 76 is retained in the leg 79 as shown in FIG. 4.

The rigid connecting rod 57 includes a pair of right angle end portions (see FIG. 8). One of the end portions extends through an opening in the support leg 60 (FIGS. 4-7) and is pivotally retained therein by a cotter pin which is inserted through an opening in the end portion. The other right angle end portion of the connecting rod is inserted through an opening in the crank arm 56 and pivotally retained therein by a cotter pin. The connecting rod 57 provides a direct connection between the stand assembly and the lock assembly so that movement of the lock assembly is coordinated with movement of the stand assembly.

When the stand assembly is in its support position as shown in FIG. 5, the crank arm 56 positions the shaft 49 and the locking arm 53 in their locking positions so that the heads of the bolt 55 engage the flat front edge of the swivel plate 32. The bolts prevent the swivel plate and the wheel from swiveling, and the wheel is maintained in a straight position in which the axle of the wheel extends transversely to the longitudinal frame tubes 17 and 18. The trailer can thereby be easily manipulated merely by lifting the front of the trailer and pulling or pushing the trailer.

When the stand assembly is moved away from its support position to its storage position as shown in FIG. 6, the connecting rod 57 rotates the crank arm 56 and the shaft 49 to rotate the locking arms 53 and bolts 55 away from the front edge of the swivel plate. When the stand assembly reaches its storage position shown in FIG. 7, the locking arms 53 and the bolts 55 have been rotated through an angle of slightly more than 90°, and the swivel plate 32 is free to swivel on the swivel shaft 29.

The locking arms 53 rotate in the opposite direction when the stand assembly is moved from its storage position to its support position. The stand assembly can be pivoted downwardly merely by grasping the leg portions 62 of the stand assembly and pulling them downwardly away from the bottom of the trailer. The connecting rod 57 will move downwardly with the stand assembly and will rotate the crank arm 56 and the shaft 49.

Since the shaft 49 is located adjacent the swivel shaft 29 and since the locking arms 53 are rotated downwardly into engagement with the front edge of the swivel plate 32, the locking arms 53 can be moved to their locking positions even if the wheel 44 is not perfectly straight. If the swivel plate 32 is rotated slightly away from its locking position, one of the bolts 55 will engage the front edge of the swivel plate before the other bolt, and continued rotation of the locking arms will force the swivel plate to rotate to its locked position.

The bolts 55 are adjustably mounted on the locking arms 53, and the position of the bolts can be adjusted merely by screwing the bolts into or out of the locking arms. This will enable the bolts to maintain the swivel plate in a fixed position when the locking arms are in their locking position.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A wheel lock and stand assembly for a trailer comprising a wheel having a horizontal axis, swivel means for mounting the wheel on the trailer so that the wheel can swivel about a vertical axis and rotate about said horizontal axis, a shaft rotatably mounted on the trailer and a pair of spaced-apart locking arms directly mounted on the shaft and fixedly secured thereto for rotation therewith, a crank mounted on the shaft for rotating the shaft and the locking arms into a locking position in which the locking arms engage the swivel means and rotate the swivel means and the wheel until said horizontal wheel axis extends generally parallel to said shaft and thereafter prevents rotation of the swivel means, the shaft and the locking arms being movable by the crank to an unlocked position in which the locking arms are not engaged with the swivel means and do not prevent rotation of the swivel means, a stand assembly pivotably mounted on the trailer and movable between a support position in which the stand assembly supports the trailer and a storage position in which the stand assembly is stored underneath the trailer, and link means connecting the stand assembly and the crank for moving the shaft to its locking position as the stand assembly moves to its support position and for moving the shaft to its unlocked position as the stand assembly moves to its storage position.

2. The structure of claim 1 in which the locking arms include adjustable stop means for engaging the swivel means.

3. The structure of claim 1 in which the swivel means includes a plate rotatably mounted on the trailer and having a straight edge, said wheel being mounted on the plate, said locking arms being engageable with said straight edge of the plate when the shaft and the locking arms move to their locking position for rotating the plate until said straight edge extends generally parallel to the shaft.

4. The assembly of claim 3 in which the shaft is rotatably mounted on the trailer adjacent said plate, said locking arms rotating downwardly into engagement with said straight edge of the plate when the shaft and the locking arms move to the locking position.

5. The structure of claim 1 in which the stand assembly includes a pair of legs pivotally mounted on the trailer, a cross member connecting the legs for common pivoting movement, brace means extending between one of the legs and the trailer for holding the stand assembly in its support position, said link means including a connecting rod pivotally attached to one of the legs and pivotally attached to the crank.

6. The structure of claim 1 in which said link means comprises a rigid rod having a pair of ends, one end of the rod being pivotally connected to the stand assembly and the other end of the rod being pivotally connected to the crank.

* * * * *